(12) United States Patent
Sburlino et al.

(10) Patent No.: US 10,909,049 B1
(45) Date of Patent: Feb. 2, 2021

(54) CONVERTING A PIN INTO A LOOPBACK PIN

(71) Applicant: Microsoft Technology Licensing, LLC, Redmond, WA (US)

(72) Inventors: Egidio Sburlino, Seattle, WA (US); Edward Sumanaseni, Sammamish, WA (US); Laxmi Narsimha Rao Kakulamarri, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/571,864

(22) Filed: Sep. 16, 2019

(51) Int. Cl.
 *G06F 13/00*   (2006.01)
 *G06F 13/12*   (2006.01)
 *G06F 9/445*   (2018.01)

(52) U.S. Cl.
 CPC ........ *G06F 13/122* (2013.01); *G06F 9/44505* (2013.01); *G06F 2213/0042* (2013.01)

(58) Field of Classification Search
 None
 See application file for complete search history.

(56) References Cited

U.S. PATENT DOCUMENTS

| | | | |
|---|---|---|---|
| 6,590,604 B1* | 7/2003 | Tucker | H04N 7/152 348/14.04 |
| 2010/0109749 A1* | 5/2010 | Chen | G06F 13/385 327/419 |
| 2014/0163716 A1* | 6/2014 | Chang | G06F 1/26 700/117 |
| 2018/0027330 A1 | 1/2018 | Rand et al. | |
| 2019/0075338 A1 | 3/2019 | Liao | |

OTHER PUBLICATIONS

"International Search Report and Written Opinion Issued in PCT Application No. PCT/US20/038305", dated Aug. 11, 2020, 10 Pages.

* cited by examiner

*Primary Examiner* — Henry Tsai
*Assistant Examiner* — Dean Phan
(74) *Attorney, Agent, or Firm* — Ray Quinney & Nebeker; Tiffany Healy (57) ABSTRACT

Methods and devices for converting a pin into a hardware loopback pin may include using configuration settings information to identify at least one pin on the USB device in communication with the computer device. The methods and devices may include converting the at least one pin into a hardware loopback pin on the USB device. The methods and devices may include receiving a hardware loopback stream with rendered audio data from the hardware loopback pin on the USB device. The methods and devices may include providing the hardware loopback stream to one or more applications executing on the computer device.

20 Claims, 5 Drawing Sheets

CONVERTING A PIN INTO A LOOPBACK PIN

BACKGROUND

The present disclosure relates to audio loopback on devices.

Applications may want to use a hardware loopback audio stream of the audio data being rendered to a speaker for various processing. For example, applications may want to use a loopback audio stream for echo cancelation or recording audio for the application. Currently, the universal serial bus (USB) specification does not support hardware audio loopback on USB devices, and thus, hardware audio loopback may not currently be performed on USB devices. Yet, applications may want to use hardware audio loopback data from a USB device for various processing.

Thus, there is a need in the art for improvements for audio loopback on devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions and at least one processor configured to communicate with the memory, wherein the at least one processor is configured to use configuration settings information to identify at least one pin on a universal serial bus (USB) device in communication with the computer device; convert the at least one pin into a hardware loopback pin on the USB device; receive a hardware loopback stream with rendered audio data from the hardware loopback pin on the USB device; and provide the hardware loopback stream to one or more applications executing on the computer device.

Another example implementation relates to a method for converting an identified pin into a hardware loopback pin on a universal serial bus (USB) device in communication with a computer device. The method may include using, via a processor on the computer device, configuration settings information to identify at least one pin on the USB device in communication with the computer device. The method may include converting, via the processor, the at least one pin into a hardware loopback pin on the USB device. The method may include receiving a hardware loopback stream with rendered audio data from the hardware loopback pin on the USB device. The method may include providing the hardware loopback stream to one or more applications executing on the computer device.

Another example implementation relates to computer-readable medium storing instructions executable by a computer device. The computer-readable medium may include at least one instruction for causing the computer device to use configuration settings information to identify at least one pin on a universal serial bus (USB) device in communication with the computer device. The computer-readable medium may include at least one instruction for causing the computer device to convert the at least one pin into a hardware loopback pin on the USB device. The computer-readable medium may include at least one instruction for causing the computer device to receive a hardware loopback stream with rendered audio data from the hardware loopback pin on the USB device. The computer-readable medium may include at least one instruction for causing the computer device to provide the hardware loopback stream to one or more applications executing on the computer device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for converting a pin on a device to a hardware loopback pin so that the device may provide hardware loopback capabilities. For example, the device may be a USB device that may include any number of channels for capturing audio and/or emitting audio. Each speaker and/or microphone of the devices may correspond to any number of channels. Currently, the USB specification does not support hardware audio loopback on USB devices. As such, hardware audio loopback may not be performed on USB devices.

The pin converted into a hardware loopback pin may be a pin on a device designated to expose a hardware loopback stream. For example, the pin may include a capture pin. The pin may be exposed as a capture pin to illustrate a direction of the data (e.g., the pin is a source of data as opposed to consuming data). Another example of the pin may include a vender specific pin where a vendor provides specific definitions for the pin. In an implementation, the device may be designed or built to expose a hardware loopback stream using the designated pin to convert into a hardware loopback pin.

As used herein, a hardware loopback stream may include audio data being rendered to the speakers on the devices for output. Additional processing on the audio may occur prior to the output of the audio via the speakers before providing the rendered audio data in the hardware loopback streams. The additional processing may include, but is not limited to, equalization, filtering, pitch shift, and/or any other effect on the audio data. As such, the hardware loopback streams may accurately represent the audio coming out of the speakers on the devices.

The methods and devices may use a hardware loopback stream instead of copying the output signal sent to the speakers as, for example, currently performed by software loopback streams. Software loopback streams may not accurately represent the audio coming out of the speakers on the devices since the software loopback streams may capture the audio data before the audio data is rendered to the speakers for output and/or prior to any additional processing that may occur on the audio data prior to output. As such, using the hardware loopback streams by applications may be more efficient than using software loopback streams since the hardware loopback streams may provide a more accurate representation of the sound produced by the speakers on the devices relative to the software loopback streams.

The computer device and/or applications running on the computer device may access the hardware loopback stream to improve one or more operations or outputs associated with the hardware loopback stream. For example, in a system that captures hardware loopback data in the form of audio data, the improved operations or outputs may include, but are not limited to, performing echo cancelation and/or obtaining an accurate recording of the audio played by a particular output device (also referred to as a render device).

The devices and methods may identify at least one pin, such as a microphone, on the device to convert into a hardware loopback pin. The hardware loopback pin may enable the audio data being rendered to the speakers of the devices to be provided in a hardware loopback stream. The audio data rendered to the speakers may include the audio data for output via the speakers on the devices. As such, the hardware loopback stream from the device may accurately represent the audio output from the speakers on the device.

The devices and methods may read configuration settings information for the device to identify the pin to convert into the hardware loopback pin. For example, registry settings may store the configuration settings information for the device. Another example may include storing the configuration settings information for the device in custom files. The configuration settings information may be obtained from a custom file for the device. For example, the custom file may be a custom INF file or other setup information file. In addition, the configuration settings information may be obtained from operating system (SO) specific firmware provided on the device.

The devices and methods may provide instructions to the devices to convert the identified pin into a hardware loopback pin. As such, the identified pin may switch from a capture device obtaining audio to a hardware loopback pin capable of providing a hardware loopback stream.

The devices and methods may receive the hardware loopback stream from the devices and may provide the hardware loopback streams to applications on the computer device.

The computer device and/or applications may want to use the hardware loopback streams from the devices for additional processing, such as, but not limited to, acoustic echo cancellation and/or recording audio coming out of the speakers. At any time applications may send an audio request for a hardware loopback stream and may use the same audio output by the speakers on the device by accessing the hardware loopback stream containing the audio data from the device. By using hardware loopback, a better representation of the audio data rendered to the speakers of the devices may be recorded in the hardware loopback streams and used by the applications.

One example may include a person using a microphone on a SKYPE call with a friend while some background music is playing on the speaker. In this case the audio captured from microphone on the SKYPE call may also include the audio from the background music if it is in close proximity to the speaker. Using the hardware loopback stream, the speaker audio (e.g., background music) may be cancelled from the microphone audio so that the friend on the SKYPE call does not hear the background music in the call.

As such, the methods and devices may be used to provide hardware loopback capabilities to USB devices. By converting at least one pin, such as, a microphone on the USB devices into a hardware loopback pin, USB devices may be able to provide hardware loopback capabilities for use with applications.

Figure 1:
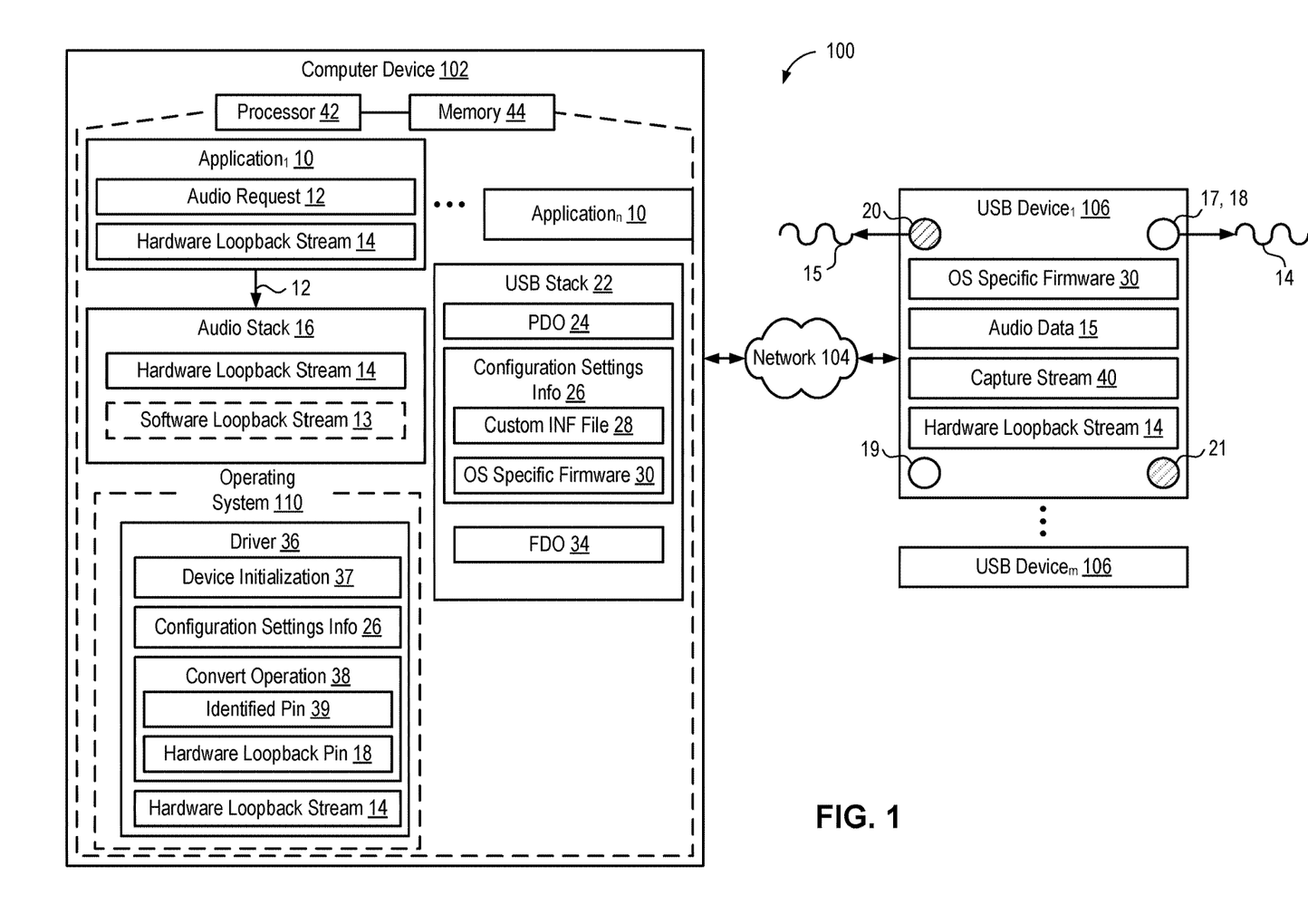
FIG. 1 is a schematic block diagram of an example computer device in communication with one or more USB devices in accordance with an implementation of the present disclosure.

Referring now to FIG. 1, a system 100 for providing hardware loopback streams 14 may include a plurality of USB devices 106 (up to m, where m is an integer) in communication with computer device 102 via a wired or wireless network 104. In an implementation, the plurality of USB devices 106 may communicate with computer device 102 via a network or bus protocol, such as, a USB connection.

USB device 106 may include any number of channels for capturing audio and/or emitting audio. For example, USB device 106 may include one or more speakers 20, 21 that supports two channels (e.g., right and left) and may include one or more microphones 17, 19. Each speaker 20, 21 and/or microphone 17, 19 of USB device 106 may correspond to any number of channels.

USB device 106 may provide hardware loopback capabilities by converting a pin on USB device 106, such as a microphone 17, into a hardware loopback pin 18. For example, the pin may include, but is not limited to, a capture pin or a vender specific pin. The pin converted into hardware loopback pin 18 may be previously identified to expose a hardware loopback stream 14. As such, USB device 106 may be designed or built to expose a hardware loopback stream 14 using the identified pin.

Hardware loopback pin 18 may provide a hardware loopback stream 14. As such, anytime audio data 15 is rendered for output from one or more speakers 20, 21 on USB devices 106, the rendered audio data 15 may be obtained by hardware loopback pin 18 on USB device 106 and provided in hardware loopback stream 14. The rendered audio data 15 for output may include any additional processing performed on the rendered audio data 15. The additional processing may include, but is not limited to, equalization, filtering, pitch shift, base boost, and/or any other effect on the audio. In addition, the rendered audio data 15 may include a mix of audio data for a plurality of applications actively rendering audio for output on USB device 106.

For example, a music application may be playing music on USB device 106 at the same time a video conference application may have a video call on USB device 106. Both applications may be actively rendering audio for output via speaker 20 and the rendered audio data 15 may include the audio data for both the music application and the video conference application. The rendered audio data 15 may correspond to the audio output from speaker 34. As such, hardware loopback stream 14 may accurately represent the audio output from the speaker 20 on USB device 106.

In an implementation, USB device 106 may include operating system (OS) specific firmware 30 that identifies at least one pin, e.g., microphone 17, on USB device 106 that may be converted into a hardware loopback pin 18. Once converted, microphone 17 may provide hardware loopback capabilities and may obtain hardware loopback stream 14. The OS specific firmware 30 may provide operating specific instructions for identifying the pin to convert it to a loopback pin. For example, the OS specific firmware 30 may provide instructions specific to WINDOWS OS. The OS specific firmware 30 may be added to USB device 106 by the hardware manufacturer for USB device 106.

USB device 106 may also include a capture stream 40 with any audio captured by microphones 17, 19. For example, if a person speaks into microphone 19 of USB device 106, capture stream 40 may include the captured audio data from the person speaking. In addition, if background music is playing nearby microphone 19 of USB device 106, capture stream 40 may include the audio data corresponding to the background music. Capture stream 40 may be used by application(s) 10 on computer device 102.

Computer device 102 may include any mobile or fixed computer device, which may be connectable to a network. Computer device 102 may be, for example, a computer device such as a desktop or laptop or tablet computer, an internet of things (TOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include a plurality of applications 10 (up to n, where n is an integer) that may be executed by processor 42 and/or memory 44. Applications 10 may use the hardware loopback streams 14 from USB device(s) 106 for additional processing, such as, but not limited to, acoustic echo cancellation and/or recording the audio data 15 coming out of the speakers 20, 21. At any time applications 10 may send an audio request 12 for a hardware loopback stream 14 to audio stack 16 and may use the same audio data 15 output by the speakers 20, 21 on USB device 106 by accessing hardware loopback stream 14 provided by audio stack 16 containing the audio data 15 output from USB device 106. By using hardware loopback, a better representation of the audio data 15 rendered to speakers 20, 21 of USB devices 106 may be recorded in hardware loopback streams 14 and used by applications 10.

Audio stack 16 may receive the audio request 12 from one or more applications 10 and may determine whether USB device(s) 106 may provide hardware loopback capabilities. For example, one or more hardware loopback streams 14 may be identified for USB device(s) 106 and audio stack 16 may determine that a hardware loopback stream 14 is available for use with USB device(s) 106. Audio stack 16 may optionally provide applications 10 with a software loopback stream 13 in response to one or more hardware loopback streams 14 not being identified for USB device(s) 106. Audio stack 16 may receive an identification of one or more hardware loopback streams 14 from a driver 36 operating on computer device 102.

Computer device 102 may include an operating system 110 that may be executed by processor 42 and/or memory 44. Memory 44 of computer device 102 may be configured for storing data and/or computer-executable instructions defining and/or associated with operating system 110, and processor 42 may execute such data and/or instructions to instantiate operating system 110. An example of memory 44 can include, but is not limited to, a type of memory usable by a computer, such as random access memory (RAM), read only memory (ROM), tapes, magnetic discs, optical discs, volatile memory, non-volatile memory, and any combination thereof. An example of processor 42 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include a driver 36 that may be used to communicate with USB device(s) 106 and/or operate USB device(s) 106. Driver 36 may also communicate with a USB stack 22 that communicates with USB device(s) 106.

When a USB device 106 is plugged into, or otherwise connected to, computer device 102, USB stack 22 may create a physical device object (PDO) 24, such as a data structure associated with a bus driver according to a device and driver layering model, that represents the connection to the bus for USB device 106. For example, USB stack 22 may detect a new connection to computer device 102 and may create the PDO 24 for USB device 106 in response to detecting the new connection.

USB stack 22 may determine configuration settings information 26 for USB device 106. The configuration settings information 26 may identify at least one pin 39 (e.g., microphone 17, 19) on USB device 106 that may be used as a hardware loopback pin 18. For example, registry settings may store the configuration settings information 26 for USB device 106. Another example may include storing the configuration settings information 26 for USB device 106 in custom files. The configuration settings information 26 may be provided using OS specific firmware 30 on USB device 106. For example, USB stack 22 may automatically locate and/or otherwise identify the OS specific firmware 30 on USB device 106. The OS specific firmware 30 may follow a standard format and the USB stack 22 may translate and/or convert the instructions provided in the OS specific firmware 30 into configuration settings information 26 for USB device 106. The configuration settings information 26 specifies a mapping of which pin 39 to convert into a hardware loopback pin 18.

The configuration settings information 26 may also be provided using a custom file, such as, but not limited to, custom INF file 28. The custom INF file 28 may set a configuration in the registry on computer device 102 that identifies at least one pin 39 on USB device 106 that may be used as a hardware loopback pin 18. As such, the custom INF file 28 may set values in the registry to specify a mapping that identifies which pin 39 to turn into a hardware loopback pin 18.

USB stack 22 may also determine a driver 36 for use with USB device 106. USB stack 22 may use one or more predefined rules in determining the appropriate driver 36 to use with USB device 106. For example, USB stack 22 may identify a USB audio class driver for use with USB device 106. USB stack 22 may create a functional device object (FDO) 34, such as a data structure associated with a function driver at a layer above the PDO 24 according to a device and driver layering model, for the determine driver 36 and may load driver 36 for the PDO 24.

Driver 36 may be a custom driver that may expose the hardware loopback pin 18 on USB device 106. For example, a custom driver may include predefined information identifying various types of hardware for USB device 106 and which terminal to convert on USB device 106 into a hardware loopback pin 18. Different hardware types may identify different pins for converting into the hardware loopback pin 18. In addition, driver 36 may be a generic driver that may read predefined configuration settings information 26 for USB device 106 set via the custom INF file 28 or the OS specific firmware 30. The configuration settings information 26 may identify whether a hardware loopback is present on USB device 106 and provide instructions for the generic driver to identify which pin 39 to convert into the hardware loopback pin 18.

Driver 36 may perform a device initialization 37 in response to a USB device 106 connecting with computer device 102. For example, when a PDO 24 is created for USB device 106, driver 36 may perform a device initialization 37 process for USB device 106. During the device initialization 37 process, driver 36 may parse a device configuration descriptor for USB device 106 (e.g., the firmware for USB device 106) to identify the capture pins (e.g., microphone 17, 19) and/or render pins (e.g., speakers 20, 21) for USB device 106. If a specific capture pin (e.g., microphone 17) is designated as a hardware loopback pin 18, driver 36 may create a topology for USB device 106 and the identified capture and/or render pins. As such, the device initialization 37 process may identify a designated hardware loopback pin 18 for USB device 106.

Driver 36 may also read the configuration settings information 26 for USB device 106. For example, USB stack 22 may provide the configuration settings information 26 to driver 36. The configuration settings information 26 may specify which pins (e.g., microphones 17, 19) 17 on USB device 106 may be turned into a hardware loopback pin 18. Driver 36 may use the configuration settings information 26 to identify one or more pins 39 on USB device 106 that may be converted into a hardware loopback pin 18.

Driver 36 may perform a convert operation 38 to convert the identified pin 39 into a hardware loopback pin 18. For example, the convert operation 38 may change the identified pin 39 from obtaining audio through microphone 17 and may connect microphone 17 to speakers 20, 21. Driver 36 may provide instructions to USB device 106 to convert the identified pin 39 (e.g., microphone 17) into a hardware loopback pin 18. For example, driver 36 may hide the identified capture pin 39 so that the identified capture pin 39 may not be visible in the user interface (UI) and may use the hardware loopback pin 18 for a hardware loopback stream 14. The hardware loopback pin 18 may be connected to a DAC (Digital to Analog Converter) Node on the render pin (e.g., speakers 20, 21) so that any audio on the render device is also captured by the hardware loopback pin 18. As such, the identified pin 39 may switch from a pin to a hardware loopback pin 18 capable of providing a hardware loopback stream 14.

Driver 36 may receive one or more hardware loopback streams 14 with the rendered audio data 15 from one or more USB devices 106. Hardware loopback streams 14 may accurately represent the audio data 15 output from speakers 20, 21 on USB device(s) 106. Driver 36 may provide the hardware loopback stream 14 to audio stack 16 and audio stack 16 may identify USB device 106 as having hardware loopback capabilities.

Audio stack 16 may provide the hardware loopback stream 14 to one or more applications 10. Applications 10 may want to use the hardware loopback stream 14 for various processing. One example may include application 10 using the hardware loopback stream 14 to perform echo cancelation on audio output from one or more USB devices 106. For example, when an individual is using a microphone 19 on USB device 106 on a SKYPE call with a friend while some background music is playing on speaker 21, capture stream 40 may include the audio from microphone 19 (e.g., the individual speaking) and audio from speaker 21 (e.g., background music). Application 10 may use the hardware loopback stream 14 to cancel out the audio from speaker 21 (e.g., the background music) so the friend does not hear the background music in the call. In another example, application 10 may want to record the audio emitted by one or more speakers 20, 21 on USB device 106. Application 10 may use the hardware loopback stream 14 and/or a portion of the hardware loopback stream 14 for the recording. For example, application 10 may identify a portion of the hardware loopback stream 14 that corresponds to a particular time frame and may extract the hardware loopback stream 14 and/or a portion of the hardware loopback stream 14 associated with the particular time frame (e.g., audio data 15) for the recording.

At any time applications 10 may access the hardware loopback stream 14 and may be able to use the same audio output by the speakers 20, 21 on any of the USB devices 106 through the hardware loopback stream 14. Moreover, since hardware loopback corresponds more closely to the audio output by the USB devices 106 than a stored stream of data input to the speakers of the respective devices, a better representation of the audio output by the USB devices 106 may be used by the applications 10.

As such, computer device 102 may be used to provide hardware loopback capabilities to USB devices 106. By converting at least one pin, such as, a microphone on USB devices 106 into a hardware loopback pin, USB devices 106 may be able to provide hardware loopback capabilities to computer device 102 for use with applications 10.

Figure 2:
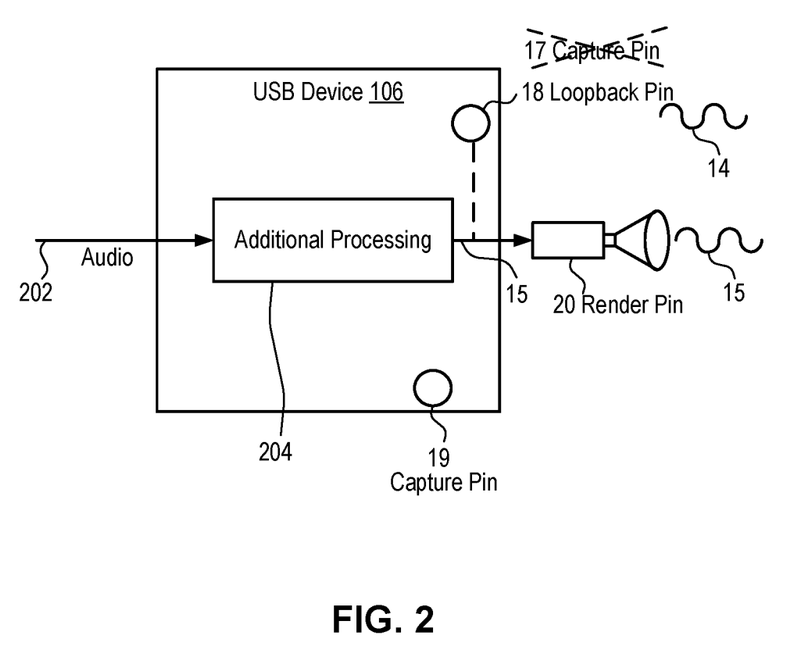
FIG. 2 illustrates an example of a USB device providing hardware loopback in accordance with an implementation of the present disclosure.

Referring now to FIG. 2, illustrated is an example of a USB device 106 providing hardware loopback. USB device 106 may receive audio 202, for example, from one or more applications 10 (FIG. 1) on computer device 102 (FIG. 1) and/or one or more pins, e.g., microphone 19, on USB device 106. As discussed in relation to FIG. 1, computer device 102 may have converted pin (e.g., microphone 17) into a hardware loopback pin 18.

USB device 106 may perform additional processing 204 on the received audio 202 prior to outputting the rendered audio data 15 via a render pin, e.g., speaker 20. The additional processing 204 may include, but is not limited to, equalization, filtering, pitch shift, base boost, and/or any other effect on the audio.

The hardware loopback pin 18 may receive the audio data 15 currently being rendered to the render pin, e.g., speaker 20, of USB device 106. The hardware loopback pin 18 may create a hardware loopback stream 14 for the rendered audio data 15. As such, anytime audio data 15 is rendered for output from speaker 20 on USB devices 106, the rendered audio data 15 may be obtained by hardware loopback pin 18 and provided in a hardware loopback stream 14. The rendered audio data 15 for output may include any additional processing 204 performed on the rendered audio data 15.

Figure 3A:
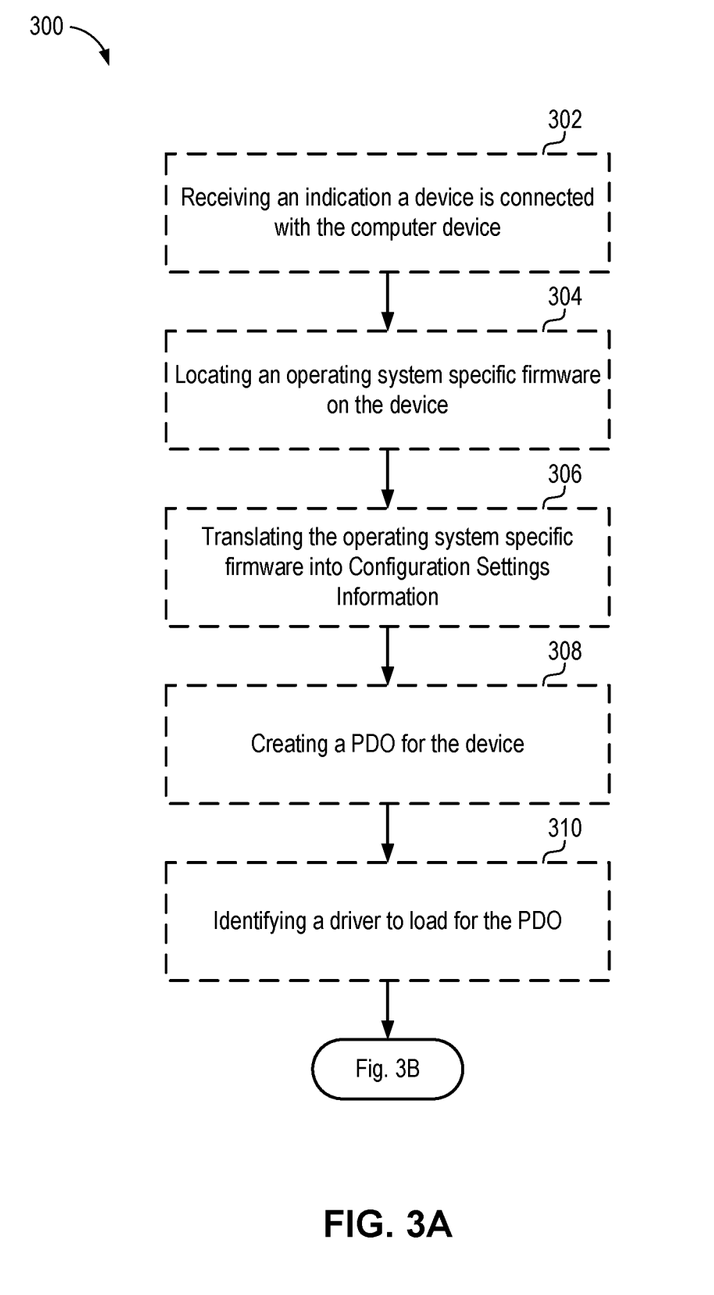
FIGS. 3A and 3B illustrate an example method for converting a pin into a hardware loopback pin on a USB device in accordance with an implementation of the present disclosure.
Figure 3B:
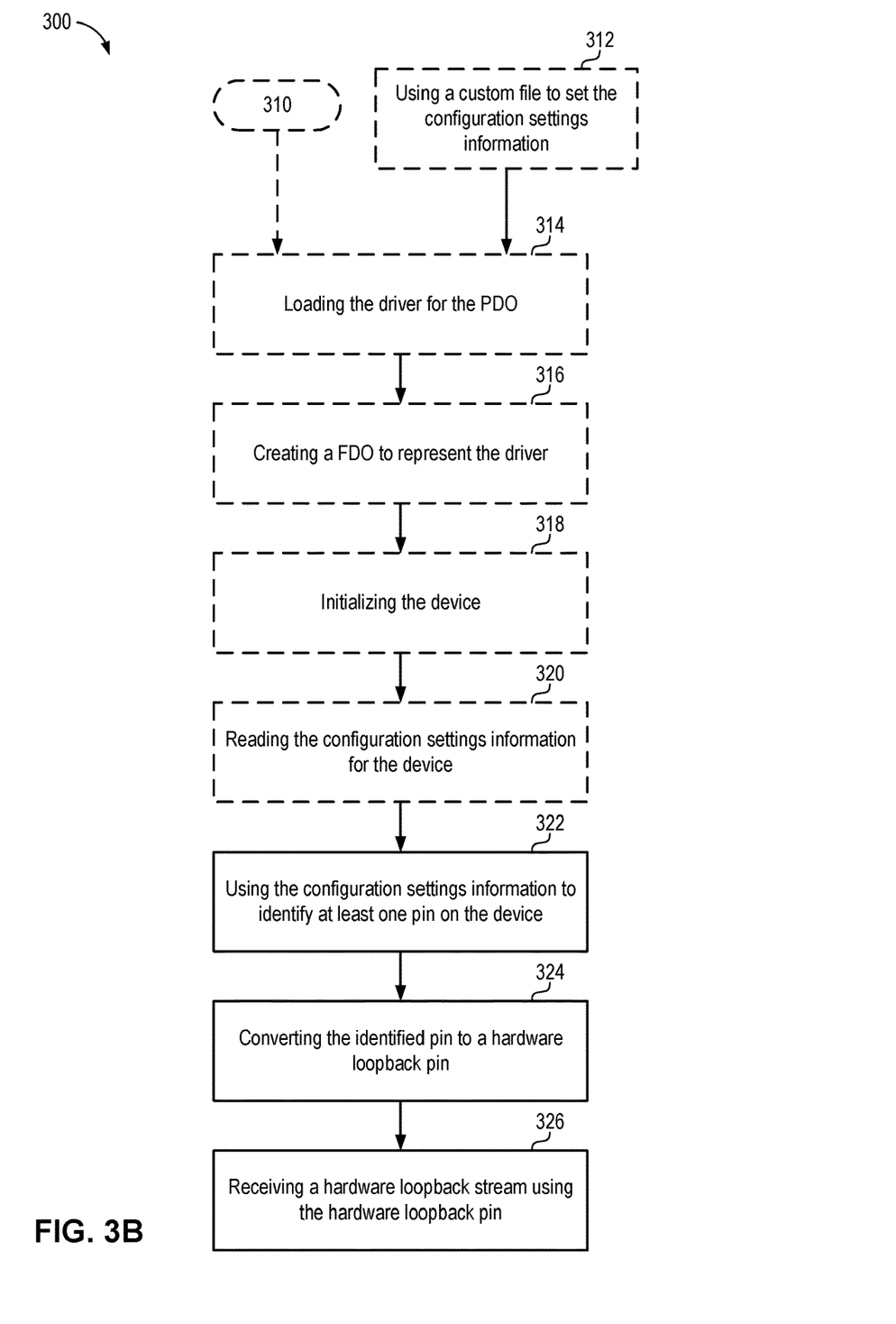

Referring now to FIGS. 3A and 3B, an example method 300 may be used by computer device 102 (FIG. 1) for converting an identified pin 39 (FIG. 1) into a hardware loopback pin 18 (FIG. 1) on a USB device 106 (FIG. 1). The actions of method 300 may be discussed below with reference to the architecture of FIG. 1.

At 302, optionally, method 300 may include receiving an indication a device is connected with the computer device. For example, USB stack 22 may detect a new connection to computer device 102 when a USB device 106 is plugged into, or otherwise connected to, computer device 102.

At 304, optionally, method 300 may include locating an operating system specific firmware on the device. For example, USB stack 22 may automatically locate and/or otherwise identify the OS specific firmware 30 on USB device 106 in response to detecting the new connection to computer device 102. The OS specific firmware 30 may identify at least one pin, e.g., microphone 17, on USB device 106 that may be converted into a hardware loopback pin 18. Once converted, microphone 17 may provide hardware loopback capabilities and may obtain hardware loopback stream 14. The OS specific firmware 30 may provide operating specific instructions for identifying the pin to convert it to a loopback pin. For example, the OS specific firmware 30 may provide instructions specific to WINDOWS OS. The OS specific firmware 30 may be added to USB device 106 by the hardware manufacturer for USB device 106.

At 306, optionally, method 300 may include translating the operating system firmware into configuration settings information. The OS specific firmware 30 may follow a standard format and the USB stack 22 may translate and/or convert the instructions provided in the OS specific firmware 30 into configuration settings information 26 for USB device 106. The configuration settings information 26 may specify a mapping that identifies which pin 39 to convert into a hardware loopback pin 18.

At 308, optionally, method 300 may include creating a physical device object (PDO) for the device. USB stack 22 may create a physical device object (PDO) 24, such as a data structure associated with a bus driver according to a device and driver layering model, that represents the connection to the bus for USB device 106.

At 310, method 300 may optionally include identifying a driver to load for the physical device object. USB stack 22 may also determine a driver 36 for use with USB device 106. USB stack 22 may use one or more predefined rules in determining the appropriate driver 36 to use with USB device 106. For example, USB stack 22 may identify a USB audio class driver for use with USB device 106.

At 312, method 300 may optionally include using a custom file to set the configuration settings information for the device. For example, the custom file may be custom INF file 28 or any other setup information file for USB device 106. The configuration settings information 26 may be provided using a custom INF file 28. The custom INF file 28 may set a configuration in the registry on computer device 102 that identifies at least one pin 39 on USB device 106 that may be used as a hardware loopback pin 18. As such, the custom INF file 28 may set values in the registry to specify a mapping that identifies which pin 39 to turn into a hardware loopback pin 18.

At 314, method 300 may optionally include loading the driver for the physical device object. For example, USB stack 22 may load driver 36 for the PDO 24. Operating system 110 may move the software program representing driver 36 and move it into memory 44 for execution by processor 42. For example, USB stack 22 may find or otherwise locate a software module responsible for interfacing with USB device 106. The software module may be an in-box driver or other third party driver. An INF file may be used during the process to select a best driver and/or module to load into memory 44 to operate and/or use with USB device 106.

At 316, method 300 may optionally include creating a functional device object (FDO) to represent the driver. USB stack 22 may create a FDO 34, such as a data structure associated with a function driver at a layer above the PDO 24 according to a device and driver layering model, for the determine driver 36.

At 318, optionally, method 300 may include initializing the device. Driver 36 may perform a device initialization 37. For example, when a PDO 24 is created for USB device 106, driver 36 may perform a device initialization 37 process for USB device 106. During the device initialization 37 process, driver 36 may parse a device configuration descriptor for USB device 106 (e.g., the firmware for USB device 106) to identify the capture pins (e.g., microphone 17, 19) and/or render pins (e.g., speakers 20, 21) for USB device 106. Driver 36 may create a topology for USB device 106 and the identified capture and/or render pins. In addition, the device initialization 37 process may identify whether a specific capture pin (e.g., microphone 17) is designated as a hardware loopback pin 18 for USB device 106.

At 320, optionally, method 300 may include reading the configuration settings information for the device. Driver 36 may also read the configuration settings information 26 for USB device 106. For example, registry settings may store the configuration settings information 26 for USB device 106. Another example may include custom files may store the configuration settings information 26 for USB device 106. USB stack 22 may provide the configuration settings information 26 to driver 36.

At 322, method 300 may include using the configuration settings information to identify at least one pin on the device. The configuration settings information 26 may specify which pins (e.g., microphones 17, 19) 17 on USB device 106 may be turned into a hardware loopback pin 18. Driver 36 may use the configuration settings information 26 to identify one or more pins 39 on USB device 106 that may be converted into a hardware loopback pin 18.

At 324, Driver 36 may perform a convert operation 38 to convert the identified pin 39 into a hardware loopback pin 18. For example, the convert operation 38 may change the identified pin 39 from obtaining audio through microphone 17 and may connect microphone 17 to speakers 20, 21. Driver 36 may provide instructions to USB device 106 to convert the identified pin 39 (e.g., microphone 17) into a hardware loopback pin 18. For example, driver 36 may hide the identified capture pin 39 so that the identified capture pin 39 may not be visible in the user interface (UI) and may use the hardware loopback pin 18 for a hardware loopback stream 14. The hardware loopback pin 18 may be connected to a DAC Node on the render pin (e.g., speakers 20, 21) so that any audio on the render device is also captured by the hardware loopback pin 18. As such, the identified pin 39 may be changed from a pin to a hardware loopback pin 18 capable of providing a hardware loopback stream 14.

At 326, method 300 may include receiving a hardware loopback stream using the hardware loopback pin. Driver 36 may receive one or more hardware loopback streams 14 with the rendered audio data 15 from one or more hardware loopback pins 18 on USB devices 106. Hardware loopback streams 14 may accurately represent the audio data 15 output from speakers 20, 21 on USB device(s) 106.

Method 300 may optionally include providing the hardware loopback streams to one or more applications 10 executing on computer device 102. Driver 36 may provide the hardware loopback stream 14 to audio stack 16. Since the hardware loopback pin 18 is connected to the render pin (e.g., speakers 20, 21) through the DAC node, the rendered audio data 15 may be copied to the capture buffer. An application 10 requesting the loopback data may read the hardware loopback stream 14 from the capture buffer.

Audio stack 16 may provide the hardware loopback stream 14 to one or more applications 10. Applications 10 may want to use the hardware loopback stream 14 for various processing. One example may include application 10 using the hardware loopback stream 14 to perform echo cancelation on audio output from one or more USB devices 106. For example, when an individual is using a microphone 19 on USB device 106 on a SKYPE call with a friend while some background music is playing on speaker 21, capture stream 40 may include the audio from microphone 19 (e.g., the individual speaking) and audio from speaker 21 (e.g., background music). Application 10 may use the hardware loopback stream 14 to cancel out the audio from speaker 21 (e.g., the background music) so the friend does not hear the background music in the call. In another example, application 10 may want to record the audio emitted by one or more speakers 20, 21 on USB device 106.

Since hardware loopback corresponds more closely to the audio output by the USB devices 106 than a stored stream of data input to the speakers of the respective devices, a better representation of the audio output by the USB devices 106 may be used by the applications 10.

As such, method 300 may be used to provide hardware loopback capabilities to USB devices 106. By converting at least one pin, such as, a microphone on USB devices 106 into a hardware loopback pin, USB devices 106 may be able to provide hardware loopback capabilities for use with applications 10.

Figure 4:
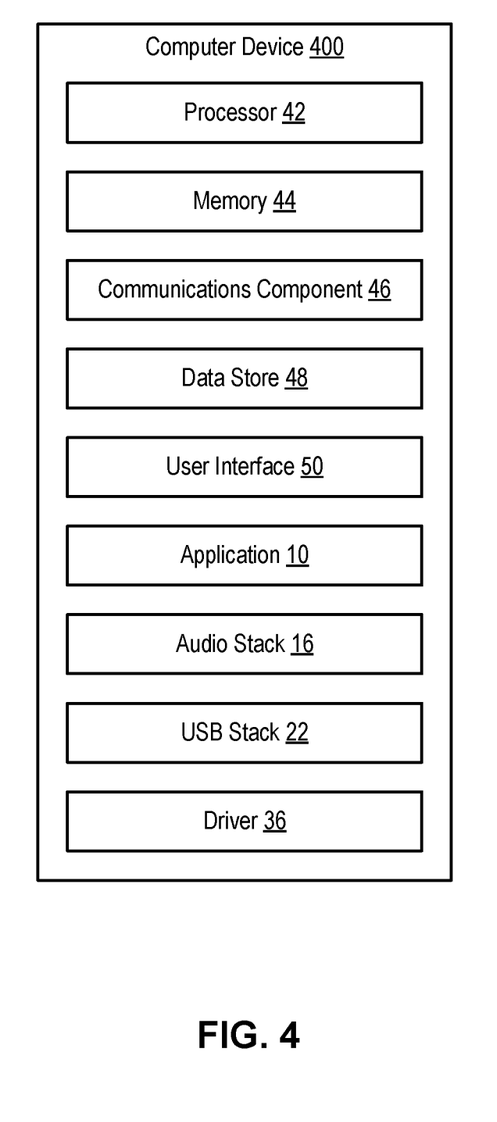
FIG. 4 is a schematic block diagram of an example device in accordance with an implementation of the present disclosure.

Referring now to FIG. 4 an example computer 400 that may be configured as computer device 102 in accordance with an implementation includes additional component details as compared to FIG. 1. In one example, computer 400 may include processor 42 for carrying out processing functions associated with one or more of components and functions described herein. Processor 42 can include a single or multiple set of processors or multi-core processors. Moreover, processor 42 can be implemented as an integrated processing system and/or a distributed processing system.

Computer 400 may further include memory 44, such as for storing local versions of applications being executed by processor 42. Memory 44 can include a type of memory usable by a computer, such as random access memory (RAM), read only memory (ROM), tapes, magnetic discs, optical discs, volatile memory, non-volatile memory, and any combination thereof. Additionally, processor 42 may include and execute operating system 110 (FIG. 1).

Further, computer 400 may include a communications component 46 that provides for establishing and maintaining communications with one or more parties utilizing hardware, software, and services as described herein. Communications component 46 may carry communications between components on computer device 102, as well as between computer device 102 and external devices, such as devices located across a communications network and/or devices serially or locally connected to computer device 102. For example, communications component 46 may include one or more buses, and may further include transmit chain components and receive chain components associated with a transmitter and receiver, respectively, operable for interfacing with external devices.

Additionally, computer 400 may include a data store 48, which can be any suitable combination of hardware and/or software, that provides for mass storage of information, databases, and programs employed in connection with implementations described herein. For example, data store 48 may be a data repository for applications 10, audio stack 16, USB stack 22, and/or driver 36.

Computer 400 may also include a user interface component 50 operable to receive inputs from a user of computer device 102 and further operable to generate outputs for presentation to the user. User interface component 50 may include one or more input devices, including but not limited to a keyboard, a number pad, a mouse, display (e.g., which may be a touch-sensitive display), a navigation key, a function key, a microphone, a voice recognition component, any other mechanism capable of receiving an input from a user, or any combination thereof. Further, user interface component 50 may include one or more output devices, including but not limited to a display, a speaker, a haptic feedback mechanism, a printer, any other mechanism capable of presenting an output to a user, or any combination thereof.

In an implementation, user interface component 50 may transmit and/or receive messages corresponding to the operation of applications 10, audio stack 16, USB stack 22, and/or driver 36. In addition, processor 42 executes applications 10, audio stack 16, USB stack 22, and/or driver 36, and memory 44 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
at least one processor configured to communicate with the memory, wherein the at least one processor is operable to:
use at least one render pin on a universal serial bus (USB) device to render audio data;
use configuration settings information to identify at least one pin on the USB device in communication with the computer device;
convert the at least one pin into a hardware loopback pin on the USB device, wherein the hardware loopback pin is converted to connect to the at least one render pin to receive the audio data that is currently rendered;
receive a hardware loopback stream with the rendered audio data from the hardware loopback pin on the USB device; and
provide the hardware loopback stream to one or more applications executing on the computer device.

2. The computer device of claim 1, wherein the configuration settings information is provided in a custom file for the USB device.

3. The computer device of claim 1, wherein the configuration settings information is provided in operating system specific firmware on the USB device.

4. The computer device of claim 3, wherein instructions provided in the operating system specific firmware are translated into the configuration settings information.

5. The computer device of claim 1, wherein the configuration settings information provides a mapping of the at least one pin to convert into the hardware loopback pin.

6. The computer device of claim 1, wherein the at least one processor is further operable to convert the at least one pin into the hardware loopback pin by providing instructions to the USB device to connect the hardware loopback pin to at least one render pin on the USB device.

7. The computer device of claim 1, wherein the one or more applications use the hardware loopback stream for at least one of echo cancellation or creating a recording.

8. A method for converting an identified pin into a hardware loopback pin on a universal serial bus (USB) device in communication with a computer device, the method comprising:
using at least one render pin on the USB device to render audio data;
using, via a processor on the computer device, configuration settings information to identify at least one pin on the USB device in communication with the computer device;
converting, via the processor, the at least one pin into the hardware loopback pin on the USB device, wherein the hardware loopback pin is converted to connect to the at least one render pin to receive the audio data that is currently rendered;
receiving a hardware loopback stream with the rendered audio data from the hardware loopback pin on the USB device; and
providing the hardware loopback stream to one or more applications executing on the computer device.

9. The method of claim 8, wherein the configuration settings information is provided in a custom file for the USB device.

10. The method of claim 8, wherein the configuration settings information is provided in operating system specific firmware on the USB device.

11. The method of claim 10, wherein the method further comprises:
translating instructions provided in the operating system specific firmware into the configuration settings information.

12. The method of claim 8, wherein the configuration settings information provides a mapping of the at least one pin to convert into the hardware loopback pin.

13. The method of claim 8, wherein converting the at least one pin into the hardware loopback pin further comprises providing instructions to the USB device to connect the hardware loopback pin to at least one render pin on the USB device.

14. The method of claim 8, wherein the one or more applications use the hardware loopback stream for at least one of echo cancellation or creating a recording.

15. A non-transitory computer-readable medium storing instructions, when being executed by a computer device, to perform the steps:
   using at least one render pin on a universal serial bus (USB) device to render audio data;
   using configuration settings information to identify at least one pin on the USB device in communication with the computer device;
   converting the at least one pin into a hardware loopback pin on the USB device, wherein the hardware loopback pin is converted to connect to the at least one render pin to receive the audio data that is currently rendered;
   receiving a hardware loopback stream with the rendered audio data from the hardware loopback pin on the USB device; and
   providing hardware loopback stream to one or more applications executing on the computer device.

16. The non-transitory computer-readable medium of claim 15, wherein the configuration settings information is provided in a custom file for the USB device.

17. The non-transitory computer-readable medium of claim 15, wherein the configuration settings information is provided in operating system specific firmware on the USB device.

18. The non-transitory computer-readable medium of claim 15, wherein the configuration settings information provides a mapping of the at least one pin to convert into the hardware loopback pin.

19. The non-transitory computer-readable medium of claim 15, wherein converting the at least one pin into the hardware loopback pin further comprises providing instructions to the USB device to connect the hardware loopback pin to at least one render pin on the USB device.

20. The non-transitory computer-readable medium of claim 15, wherein the one or more applications use the hardware loopback stream for at least one of echo cancellation or creating a recording.

\* \* \* \* \*